United States Patent
Hill

(10) Patent No.: US 11,428,029 B2
(45) Date of Patent: Aug. 30, 2022

(54) COLLET LATCH

(71) Applicant: Carrier Corporation, Jupiter, FL (US)

(72) Inventor: Matthew S. Hill, Aumsville, OR (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 324 days.

(21) Appl. No.: 16/490,380

(22) PCT Filed: Feb. 28, 2018

(86) PCT No.: PCT/US2018/020242
§ 371 (c)(1),
(2) Date: Aug. 30, 2019

(87) PCT Pub. No.: WO2018/160706
PCT Pub. Date: Sep. 7, 2018

(65) Prior Publication Data
US 2020/0071964 A1    Mar. 5, 2020

Related U.S. Application Data

(60) Provisional application No. 62/465,364, filed on Mar. 1, 2017.

(51) Int. Cl.
*E05B 63/12* (2006.01)
*E05B 47/00* (2006.01)
(Continued)

(52) U.S. Cl.
CPC ........ *E05B 63/121* (2013.01); *E05B 19/0005* (2013.01); *E05B 47/0012* (2013.01);
(Continued)

(58) Field of Classification Search
CPC ......... E05B 47/0012; E05B 2047/0024; E05B 63/12; E05B 63/121; E05B 2063/0026;
(Continued)

(56) References Cited

U.S. PATENT DOCUMENTS

| | | | | |
|---|---|---|---|---|
| 117,764 A | * | 8/1871 | Gibson | E05B 65/48 70/13 |
| 1,455,770 A | * | 5/1923 | Anderson | E05B 67/22 70/35 |

(Continued)

FOREIGN PATENT DOCUMENTS

| | | |
|---|---|---|
| FR | 2917349 A1 | 12/2008 |
| JP | 3171841 U | 11/2011 |
| WO | 2005047714 A1 | 5/2005 |

OTHER PUBLICATIONS

International Search Report; International Application No. PCT/US2018/020242; International Filing Date Feb. 28, 2018; dated May 18, 2018; 12 pages.

(Continued)

*Primary Examiner* — Christopher J Boswell
(74) *Attorney, Agent, or Firm* — Cantor Colburn LLP

(57) ABSTRACT

A locking module for selectively coupling a first component and a second component of a lockable device includes a locking element including a plurality of locking fingers movable between an open position and a closed position. The plurality of locking fingers being biased to said open position. A biasing mechanism is coupled to said locking element and a compression force applied by said biasing mechanism to said plurality of locking fingers controls movement of said plurality of locking fingers between said open position and said closed position. An actuator associated with said biasing mechanism is operable to control said compression force to selectively lock said locking element.

15 Claims, 5 Drawing Sheets

(51) Int. Cl.
  *E05B 19/00* (2006.01)
  *E05B 65/52* (2006.01)
  *E05B 67/00* (2006.01)
  *E05B 63/00* (2006.01)
  *F16B 21/06* (2006.01)

(52) U.S. Cl.
  CPC ............ *E05B 65/52* (2013.01); *E05B 67/003* (2013.01); *E05B 2047/0024* (2013.01); *E05B 2063/0026* (2013.01); *F16B 21/065* (2013.01)

(58) Field of Classification Search
  CPC ...... E05B 65/48; E05B 65/52; E05B 65/5215; E05B 67/003; E05B 67/22; E05B 19/0005; F16B 21/065
  See application file for complete search history.

(56) References Cited

U.S. PATENT DOCUMENTS

| | | | | |
|---|---|---|---|---|
| 1,743,331 | A * | 1/1930 | Ellison | E05B 67/22 70/38 A |
| 2,190,661 | A * | 2/1940 | Hauer | F16G 11/106 70/49 |
| 3,435,642 | A * | 4/1969 | Pesco | E05B 67/003 70/49 |
| 3,765,196 | A * | 10/1973 | Balicki | E05B 67/003 70/49 |
| 3,856,081 | A | 12/1974 | Canalizo | |
| 3,896,698 | A * | 7/1975 | Aylott | F16B 21/073 411/548 |
| 3,953,990 | A * | 5/1976 | Nagel | E05B 67/003 70/18 |
| 4,044,622 | A | 8/1977 | Matthews | |
| 4,164,977 | A | 8/1979 | Arendt et al. | |
| 4,379,488 | A | 4/1983 | Hamm | |
| 4,446,708 | A * | 5/1984 | Ely | E05B 73/00 379/445 |
| 4,545,434 | A | 10/1985 | Higgins | |
| 4,655,290 | A | 4/1987 | Smith, Jr. | |
| 4,726,421 | A | 2/1988 | Akkerman et al. | |
| 4,762,030 | A | 8/1988 | Nguyen | |
| 4,828,023 | A | 5/1989 | Leggett | |
| 4,836,707 | A * | 6/1989 | Myers | B25B 5/08 24/635 |
| 5,158,331 | A | 10/1992 | Wesselski et al. | |
| 5,170,650 | A * | 12/1992 | Kortenbrede | E05B 67/003 70/386 |
| 5,992,187 | A * | 11/1999 | Derman | E05B 67/003 70/30 |
| 6,526,785 | B1 * | 3/2003 | Asenstorfer | E05B 67/006 70/53 |
| 6,609,399 | B1 * | 8/2003 | Daniels, Jr. | E05B 67/003 70/30 |
| 6,629,440 | B1 * | 10/2003 | Meekma | E05B 67/003 70/49 |
| 6,997,420 | B2 * | 2/2006 | Yudis | F16L 35/00 70/14 |
| 7,039,987 | B2 * | 5/2006 | van Gijsel | F16G 11/106 24/134 P |
| 7,293,438 | B2 * | 11/2007 | Benda | F16G 11/106 70/49 |
| 7,360,594 | B2 | 4/2008 | Giroux et al. | |
| 7,870,764 | B2 * | 1/2011 | Burmesch | E05B 67/003 70/38 C |
| 8,146,672 | B2 | 4/2012 | Eriksen | |
| 8,429,940 | B2 * | 4/2013 | Evans | E05B 67/003 70/52 |
| 8,646,548 | B2 | 2/2014 | Wells et al. | |
| 8,726,703 | B1 * | 5/2014 | Derman | E05B 73/0082 70/58 |
| 9,179,742 | B2 * | 11/2015 | Richardson | F16B 21/073 |
| 2005/0223758 | A1 | 10/2005 | Yu | |
| 2012/0189381 | A1 | 7/2012 | Fairchild et al. | |

OTHER PUBLICATIONS

Wesselski et al.; "Preloading Collet Latch"; NASA Technical Reports Server; Mar. 1, 1992; https://ntrs.nasa.gov/search.jsp?R=19920000176.

Written Opinion; International Application No. PCT/US2018/020242; International Filing Date Feb. 28, 2018 dated May 18, 2018; 14 pages.

Japanese Office Action; Japanese Application No. 2019-547280; dated Nov. 30, 2021; 12 pages.

\* cited by examiner

COLLET LATCH

CROSS REFERENCE TO RELATED APPLICATIONS

This application is a National Stage application of PCT/US2018/020242, filed Feb. 28, 2018, which claims the benefit of U.S. Provisional Application No. 62/465,364, filed Mar. 1, 2017, both of which are incorporated by reference in their entirety herein.

BACKGROUND

This disclosure relates generally to a lockable device and, more particularly, to a locking module for use in a lockable device.

Lockboxes typically provide a secured storage area for a key or other access aid at a location close to a locked property accessible by the key. In this way, an authorized user can unlock the lockbox to gain access to the secured storage area and then use the key contained therein to unlock the locked property.

The lockbox is typically attached to a door handle or to another stationary object near the traditional lock. The lockbox typically requires the user to demonstrate that he is authorized to obtain access to the locked property before the secured storage area is unlocked to allow the user to obtain the key. In a mechanical lockbox, the user might be required to enter a correct lock combination to access the secured storage area. In an electronic lockbox, the user might be required to communicate a credential to lockbox (via a physical connection to the lockbox or via a wireless link to the lockbox) to access the secured storage area.

SUMMARY

According to one embodiment, a locking module for selectively coupling a first component and a second component of a lockable device includes a locking element including a plurality of locking fingers movable between an open position and a closed position. The plurality of locking fingers being biased to said open position. A biasing mechanism is coupled to said locking element and a compression force applied by said biasing mechanism to said plurality of locking fingers controls movement of said plurality of locking fingers between said open position and said closed position. An actuator associated with said biasing mechanism is operable to control said compression force to selectively lock said locking element.

In addition to one or more of the features described above, or as an alternative, in further embodiments said actuator is movable between a first position and a second position, in said first position, said plurality of fingers are biased to said open position, and in said second position, said compression force of said biasing mechanism retains said plurality of locking fingers in said closed position.

In addition to one or more of the features described above, or as an alternative, in further embodiments said actuator is in said first position, said actuator reduces said compression force of said biasing mechanism acting on said plurality of locking fingers.

In addition to one or more of the features described above, or as an alternative, in further embodiments said biasing mechanism includes a pair of free ends and said actuator is positioned between said free ends.

In addition to one or more of the features described above, or as an alternative, in further embodiments said actuator has a first portion engaged with said biasing mechanism when said actuator is in a first position and a second portion engaged with said biasing mechanism when said actuator is in said second position, said first portion has a larger thickness than said second portion.

In addition to one or more of the features described above, or as an alternative, in further embodiments said actuator is rotatable about an axis between said first position and said second position.

In addition to one or more of the features described above, or as an alternative, in further embodiments said plurality of locking fingers define an opening, and when said plurality of locking fingers are in said open position, said opening has a first diameter, and when said plurality of locking fingers are in said closed position, said opening has a second diameter, said second diameter being smaller than said first diameter.

In addition to one or more of the features described above, or as an alternative, in further embodiments comprising a cable element receivable within said locking element.

In addition to one or more of the features described above, or as an alternative, in further embodiments said cable element has a cable body and a tip disposed at an end of said cable body, a diameter of said tip is smaller than a diameter of said cable body.

In addition to one or more of the features described above, or as an alternative, in further embodiments said diameter of said tip is larger than said opening when said plurality of locking fingers are in said closed position.

According to another embodiment, a method of operating a locking module of a lockable device includes applying a force to a cable element arranged within a hollow interior of a locking element of the locking module, biasing a plurality of locking fingers of said locking element to an open position, operating an actuator to retain said plurality of locking fingers in said open position, and decoupling said cable element from said locking element.

In addition to one or more of the features described above, or as an alternative, in further embodiments said diameter of said cable element biases said plurality of locking fingers to said open position.

In addition to one or more of the features described above, or as an alternative, in further embodiments operating said actuator includes rotating said actuator relative to a biasing mechanism, said actuator being rotated to a position where a compression force of said biasing mechanism acting on said plurality of locking fingers is reduced.

In addition to one or more of the features described above, or as an alternative, in further embodiments operating said actuator includes rotating an actuator such that a first portion of said actuator is positioned within a gap formed between a pair of free ends of said biasing mechanism, said first portion having a thickness larger than said gap.

According to another embodiment, a method of operating a locking module includes inserting a cable element into a hollow interior of a locking element of the locking module, the locking element having plurality of locking fingers movable between an open position and a closed position, operating an actuator to move said plurality of locking fingers to said closed position, and moving said cable element relative to said locking element such that when said plurality of locking fingers are in said closed position, further movement of said cable element is restricted by said tip of said cable element.

In addition to one or more of the features described above, or as an alternative, in further embodiments operating said actuator includes applying a compression force to said plurality of locking fingers.

In addition to one or more of the features described above, or as an alternative, in further embodiments a diameter of said tip is greater than a diameter of an opening formed by said plurality of locking fingers in said closed position.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

The detailed description explains embodiments of the present disclosure, together with advantages and features, by way of example with reference to the drawings.

DETAILED DESCRIPTION

Figure 1A:
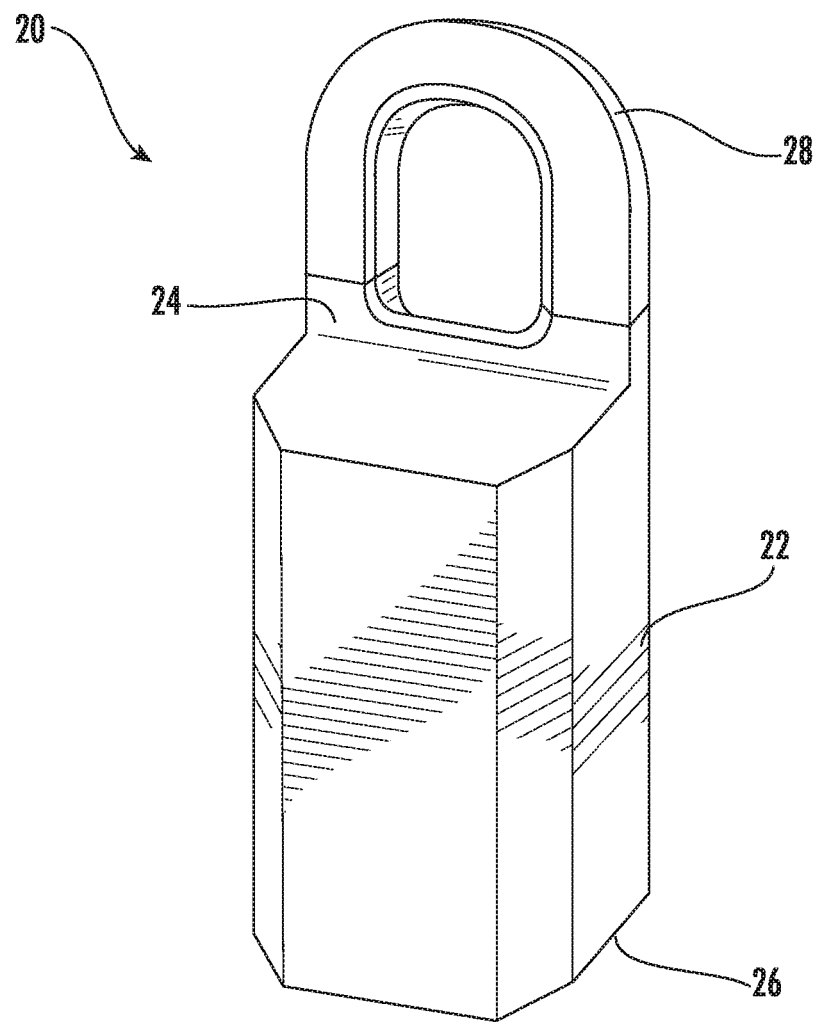
FIG. 1A is a perspective view of an example of a lockable device in a closed configuration.
Figure 1B:
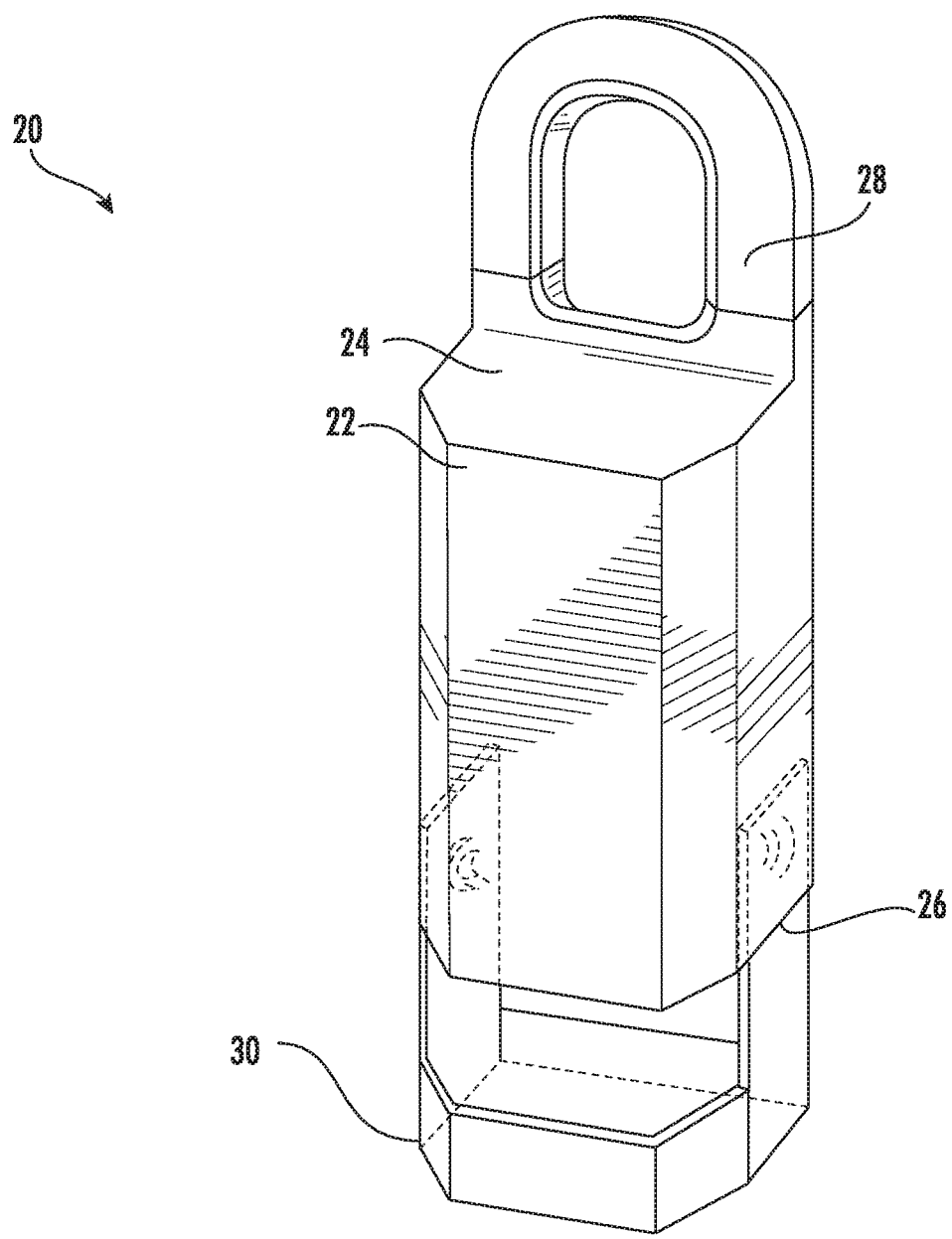
FIG. 1B is a perspective view of an example of a lockable device having a keybox in an extended position.

Referring now to FIGS. 1A and 1B, an example of a lockable device 20, such as a lockbox is illustrated. The lockbox 20 includes a body 22 and one or more components movable relative to the body 22. For example, the lockbox 20 additionally includes a shackle 28 positioned adjacent a first end 24 of the body 22 and a keybox 30 (best shown in FIG. 1B) positioned adjacent a second, opposite end 26 of the body 22. The shackle 28 may be configured to translate and/or rotate relative to the body 22. Alternatively, or in addition, the keybox 30 may be configured to translate relative to the body 22. In an embodiment, at least one of the shackle 28 and the keybox 30 is separable from the body 22.

A locking module 40 (FIG. 2) is operable to selectively couple a first component and a second component. In an embodiment, when applied to a lockable device, such as lockbox 20 for example, the locking module 40 selectively locks the shackle 28 to the body 22. Accordingly, the locking module 40 restricts movement of the lockbox 20 once arranged in a desired location via the shackle 28. Alternatively or in addition, the locking module 40 may be used to selectively lock the keybox 30 to the body 22. In such instances, operation of the locking module 40 may provide an authorized user with access to the internal cavity of the keybox 30, within which one or more items, such as a key for example, may be stored.

Figure 2:
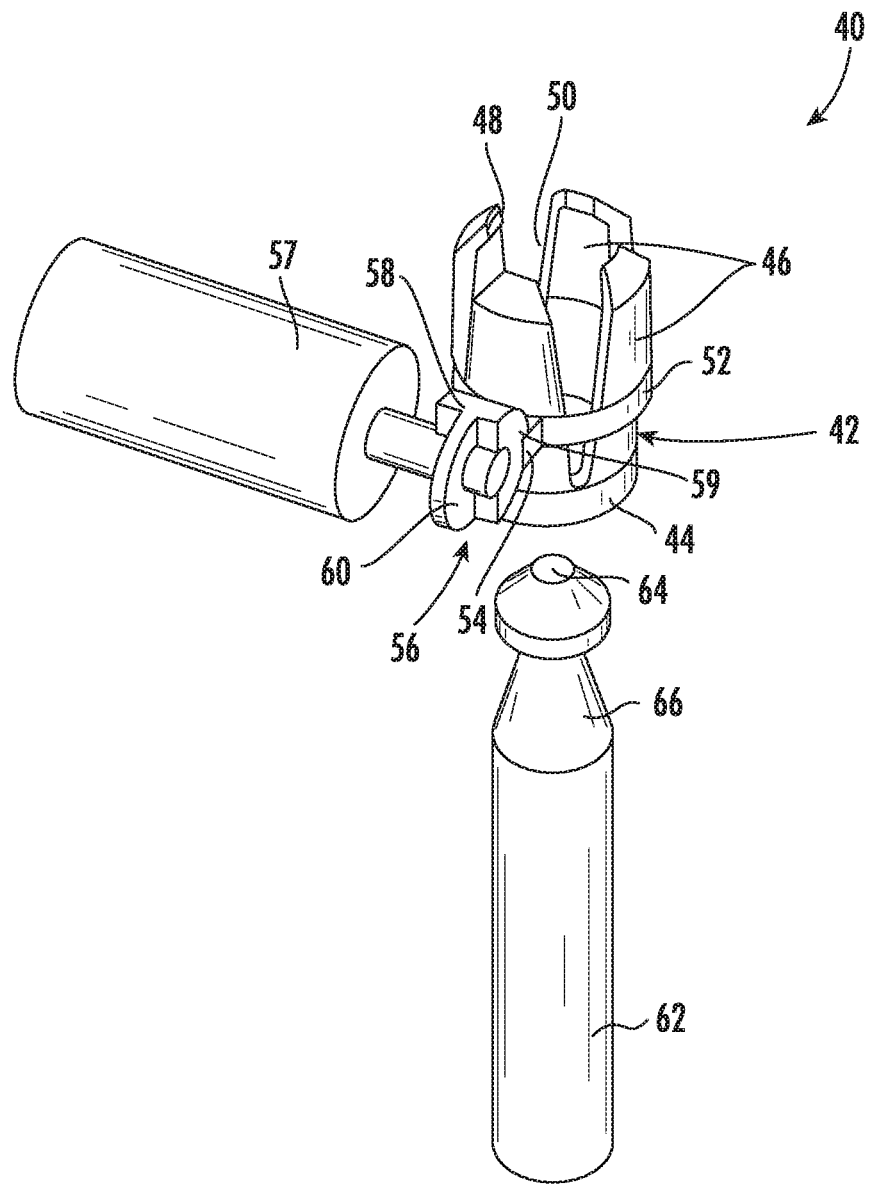
FIG. 2 is a perspective view of an unlocked locking module associated with a portion of a lockable device according to an embodiment.
Figure 3:
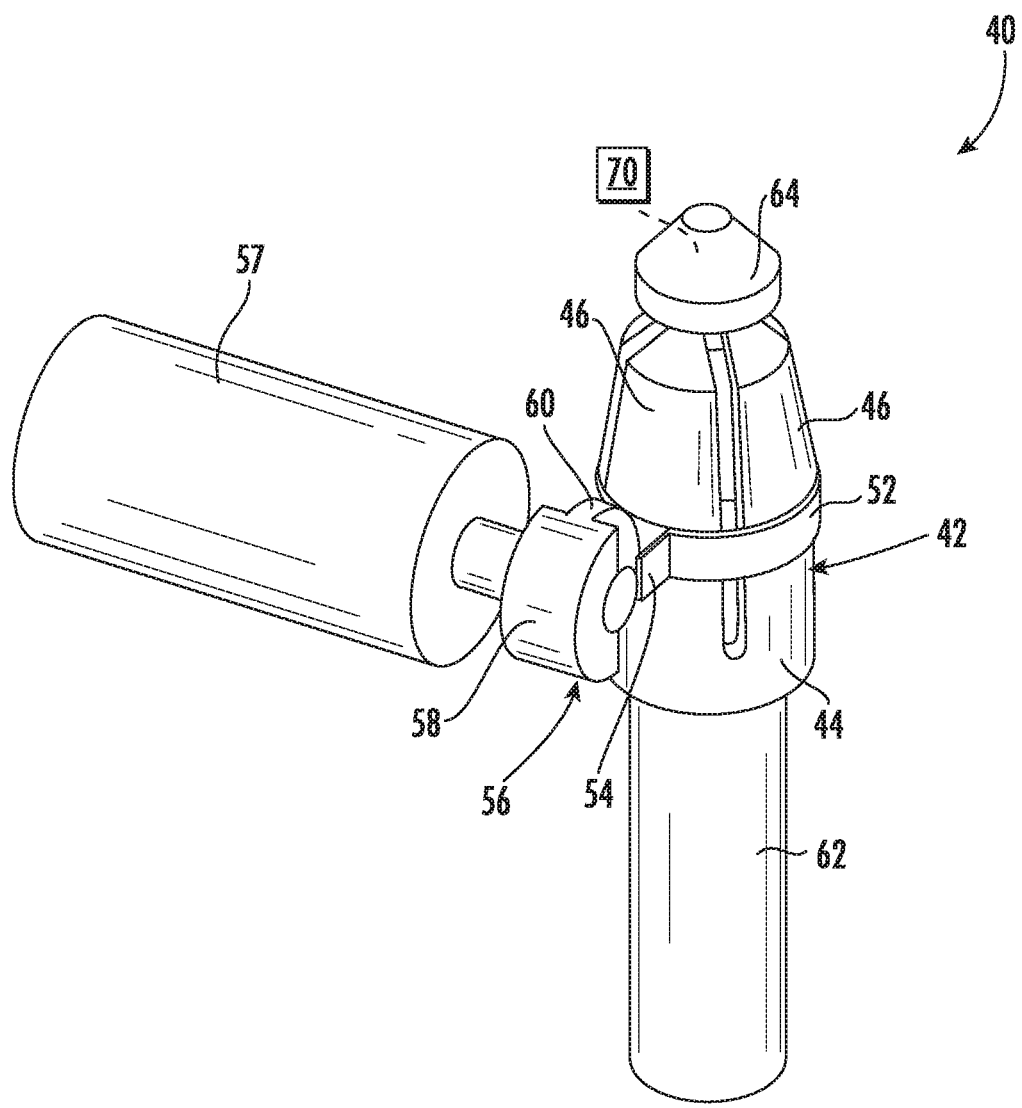
FIG. 3 is a perspective view of a locked locking module associated with a portion of a lockable device according to an embodiment.
Figure 4A:
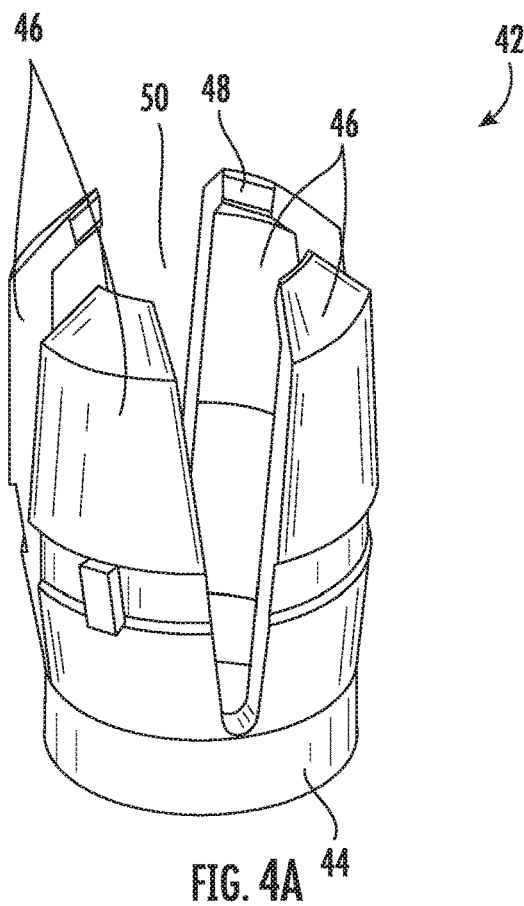
FIGS. 4A and 4B are perspective views of a locking element of the locking module in an open position and a closed position according to an embodiment.
Figure 4B:
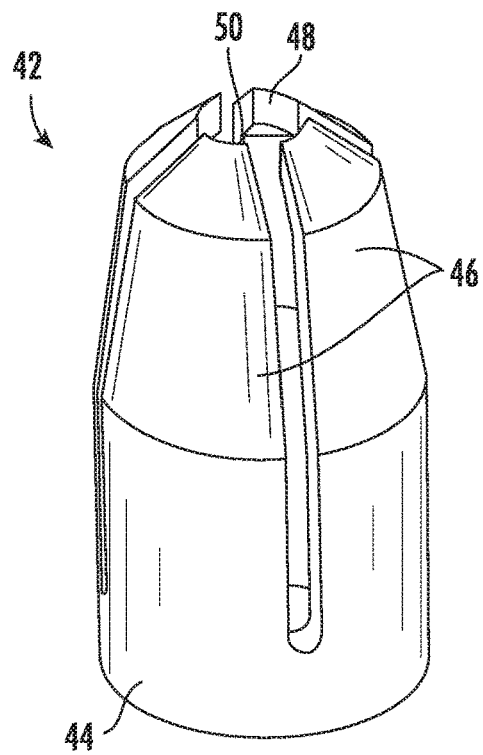

With reference now to FIG. 2-4B, the locking module 40 for selectively coupling the shackle 28 to the body 22 of a lockbox 20 is illustrated in more detail. As shown, the locking module 40 includes a substantially hollow locking element 42 having a base 44 and plurality of locking fingers 46 integrally formed with the base 44. The locking fingers 46 may be formed from a resilient material such that the fingers 46 are movable between an open position (FIG. 4a) and a closed configuration (FIG. 4b). In an embodiment, the locking fingers 46 are biased into the open position.

The distal end 48 of the plurality of locking fingers 46 defines an opening 50. The size of the opening 50 is dependent on the position of the locking fingers 46. For example, when the locking fingers 46 are in an open position, as shown in FIG. 4a, the opening 50 has a diameter greater than the maximum diameter of a component receivable therein. When locking fingers 46 are in the closed position, however, the opening 50 has a reduced diameter, substantially smaller than the maximum diameter of the component receivable therein.

Wrapped about a circumference of the locking fingers 46 of the locking element 42 is biasing mechanism 52, such as a compression spring for example. The compression force of the biasing mechanism 52 opposes the biasing force of the locking fingers 46. The free ends 54 of the biasing mechanism 52 are operably coupled to an actuator 56, such as a cam for example. In an embodiment, the actuator 56 is positioned between the free ends 54 of the biasing mechanism 52 and is operable to control the compression force applied by the biasing mechanism 52 to the locking fingers 46 to selectively transition the locking element 42 between an open position and a closed position.

In an embodiment, a thickness of the actuator 56 increases about the periphery of the actuator 56 such that at least one side of the actuator 56 is a cam or ramp-like surface 59. As shown, a first portion 58 of the actuator has a first, relatively large thickness, and a second portion 60 of the actuator 56 has a second, relatively small thickness. The actuator 56 is rotatable about an axis between a first position and a second position in response to operation of a mechanism, illustrated schematically at 57, operably coupled thereto. The mechanism 57 for rotating the actuator 56 may be mechanically operated by a user, or alternatively, may include an electromechanical mechanism, such as a motor, solenoid, or a piezoelectric device for example, directly or indirectly coupled to the actuator 56. In such embodiments, the mechanism 57 may be operable in response to an electrical input, such as generated by a code entered via a key pad or upon detection of an identification device, such as an RFID tag for example, having acceptable credentials.

When the actuator 56 is in a first position, as shown in FIG. 2, the actuator 56 is oriented such that the first portion 58 is arranged between the free ends 54 of the biasing mechanism 52. Because the thickness of the first portion 58 is larger than the normal gap between the free ends 54, the actuator 56 applies an outward force to the ends 54 of the biasing mechanism 52. As a result, the biasing mechanism 52 may be sufficiently loosened about the periphery of the locking element 42 to allow the locking fingers 46 to bias to an open position. However, in alternative embodiments, the thickness of the first portion 58 of the actuator 56 may apply a force to the biasing mechanism 52, but the force may not be sufficient to allow the locking fingers 46 to pivot to a fully open position. When the actuator 56 is in a second position, as shown in FIG. 3, the actuator 56 is oriented such that the second portion 60 is arranged between the free ends 54 of the biasing mechanism 52. The reduced thickness of the second portion 60 applies minimal or no force to the free ends 54 of the biasing mechanism 52, thereby allowing the compression force of the biasing mechanism 52 to oppose the biasing force of the locking fingers 46 and retain the locking element 42 in a closed position. By forming the actuator 56 with at least one ramp-like surface 59, rotation of the actuator 56 about its axis will cause the force applied by the biasing mechanism 52 to the locking fingers 46 to adjust gradually.

As best shown in FIGS. 2 and 3, a shackle cable 62 is receivable within the locking element 42 to couple the shackle 28 to the body 22 of the lockbox 20. Mounted to the end of the shackle cable 62 is a tip 64 having a diameter slightly smaller than the diameter of the cable 62. However, a portion 66 (FIG. 2) of the cable 62 directly adjacent the tip 64 has a substantially reduced diameter, smaller than the diameter of both the cable 62 and the tip 64.

In operation, to lock the shackle 28 to the body 22, the shackle cable 62 is inserted through the locking element 42 when the actuator 56 is in the first position and the locking fingers 46 are arranged in an open configuration. The shackle cable 62 is inserted such that the cable 62 is positioned between the locking fingers 46. The mechanism 57 is then operated to rotate the actuator 56 from the first position to the second position, thereby allowing the biasing mechanism 52 to return to its compressed state. As the compression force of the biasing mechanism 52 is applied to the locking fingers 46, the shackle cable 62 moves relative to the locking element 42. The locking fingers 46 close about portion 66 of the cable 62 such that the diameter of the tip 64 engages the end of the locking fingers 46 to restrict further movement of the cable 62 away from the locking element 42. To release the shackle cable 62, the cable 62 is pushed upwardly through the locking fingers 46 to force the fingers 46 open. The actuator 56 is then rotated from the second position to the first position to retain the locking fingers 46 in the open position so that the shackle cable 62 may be removed from the locking element 42.

Alternatively, in embodiments where the locking fingers 46 are not in a fully open when the actuator 56 is in the first position, the outward force generated in the locking element 42 when the shackle cable 62 is inserted into the locking element 42 is configured to overcome the biasing force of the biasing mechanism 52. As a result, the free ends 54 of the biasing mechanism 52 spread to a distance greater than the thickness of the actuator 56, to allow the locking fingers 46 to bias open, and the shackle cable 62 to be received therein. In such embodiments, a sensor 70 may be operatively associated with the locking module 40, to determine when the shackle cable 62 is received within the locking element 42 and drive rotation of the actuator 56 to the second position to restrict movement of the shackle cable 62 therefrom.

The locking module 40 illustrated and described herein has a simplified configuration resulting in a reduced cost. Further, the locking module 40 is not susceptible to an attack or vandalism.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in spirit and/or scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

What is claimed:

1. A locking module for selectively coupling a first component and a second component of a lockable device comprising:
  a locking element including a plurality of locking fingers movable between an open position and a closed position, said plurality of locking fingers being biased to said open position;
  a biasing mechanism coupled to said locking element, wherein a compression force applied by said biasing mechanism to said plurality of locking fingers controls movement of said plurality of locking fingers between said open position and said closed position; and
  an actuator associated with said biasing mechanism, said actuator being arranged at an exterior of said locking element and being operable to control said compression force to selectively lock said locking element, wherein said actuator is movable between a first position and a second position, in said first position, said plurality of fingers are biased to said open position, and in said second position, said compression force of said biasing mechanism retains said plurality of locking fingers in said closed position.

2. The locking module of claim 1, wherein when said actuator is in said first position, said actuator reduces said compression force of said biasing mechanism acting on said plurality of locking fingers.

3. The locking module of claim 1, wherein said biasing mechanism includes a pair of free ends and said actuator is positioned between said free ends.

4. The locking module of claim 1, wherein said actuator has a first portion engaged with said biasing mechanism when said actuator is in a first position and a second portion engaged with said biasing mechanism when said actuator is in said second position, said first portion has a larger thickness than said second portion.

5. The locking module of claim 4, wherein said actuator is rotatable about an axis between said first position and said second position.

6. The locking module of claim 5, further comprising a cable element receivable within said locking element.

7. The locking module of claim 6, wherein said cable element has a cable body and a tip disposed at an end of said cable body, a diameter of said tip is smaller than a diameter of said cable body.

8. The locking module of claim 6, wherein said diameter of said tip is larger than said opening when said plurality of locking fingers are in said closed position.

9. The locking module of claim 1, wherein said plurality of locking fingers define an opening, and when said plurality of locking fingers are in said open position, said opening has a first diameter, and when said plurality of locking fingers are in said closed position, said opening has a second diameter, said second diameter being smaller than said first diameter.

10. A method of operating a locking module of a lockable device comprising:
  applying a force to a cable element arranged within a hollow interior of a locking element of the locking module;
  opposing a biasing force of a biasing mechanism surrounding a circumference of a plurality of locking fingers of said locking element via said cable element to transform the locking element to an open position;
  operating an actuator to retain said plurality of locking fingers in said open position; and
  decoupling said cable element from said locking element.

11. The method of claim 10, wherein said diameter of said cable element biases said plurality of locking fingers to said open position.

12. The method of claim 10, wherein operating said actuator includes rotating said actuator relative to a biasing mechanism, said actuator being rotated to a position where a compression force of said biasing mechanism acting on said plurality of locking fingers is reduced.

13. The method of claim 12, wherein operating said actuator includes rotating said actuator such that a first portion of said actuator is positioned within a gap formed between a pair of free ends of said biasing mechanism, said first portion having a thickness larger than said gap.

14. A method of operating a locking module comprising:
    inserting a cable element into a hollow interior of a locking element of the locking module, the locking element having plurality of locking fingers movable between an open position and a closed position;
    operating an actuator to move said plurality of locking fingers to said closed position, wherein in said closed position a tip of said cable element is arranged at an exterior of said locking element;
    moving said cable element relative to said locking element such that when said plurality of locking fingers are in said closed position, further movement of said cable element is restricted by said tip of said cable element, wherein a diameter of said tip is greater than a diameter of an opening formed by said plurality of locking fingers in said closed position.

15. The method of claim 14, wherein operating said actuator includes applying a compression force to said plurality of locking fingers.

\* \* \* \* \*